Sept. 18, 1951      A. E. MURRAY      2,568,291

PROCESS OF MAKING SHOES

Filed Dec. 19, 1946      4 Sheets-Sheet 1

INVENTOR.
ALAN E. MURRAY.
BY Arthur Wright
ATTORNEY.

Sept. 18, 1951  A. E. MURRAY  2,568,291
PROCESS OF MAKING SHOES
Filed Dec. 19, 1946  4 Sheets-Sheet 2
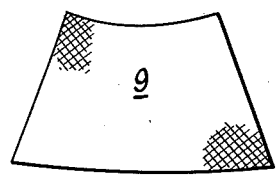
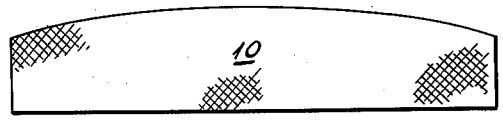
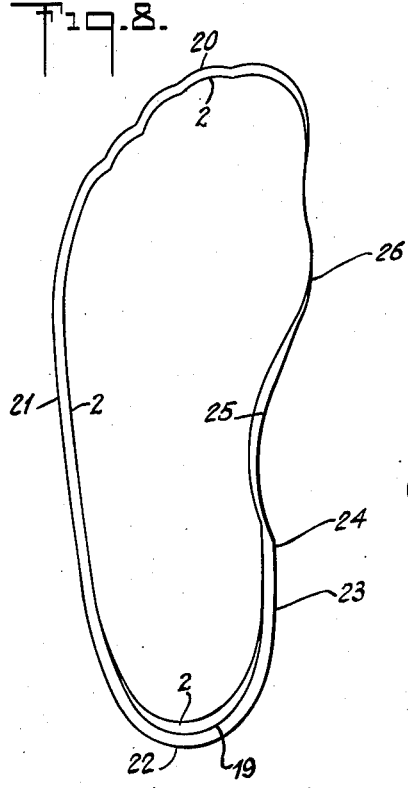
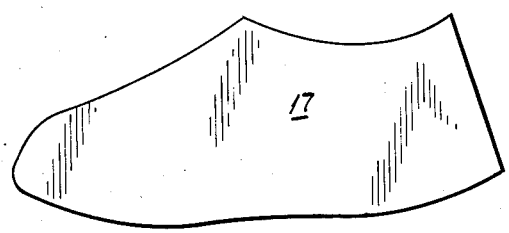
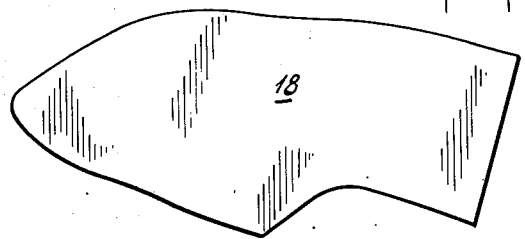
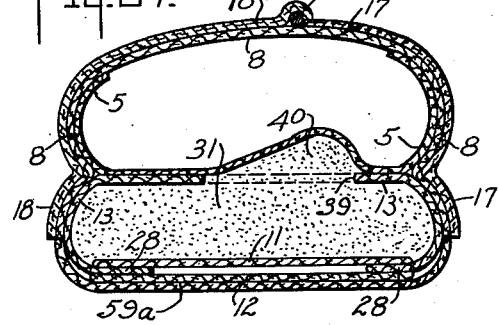
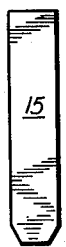
INVENTOR.
ALAN E. MURRAY.
BY Arthur Wright
ATTORNEY.

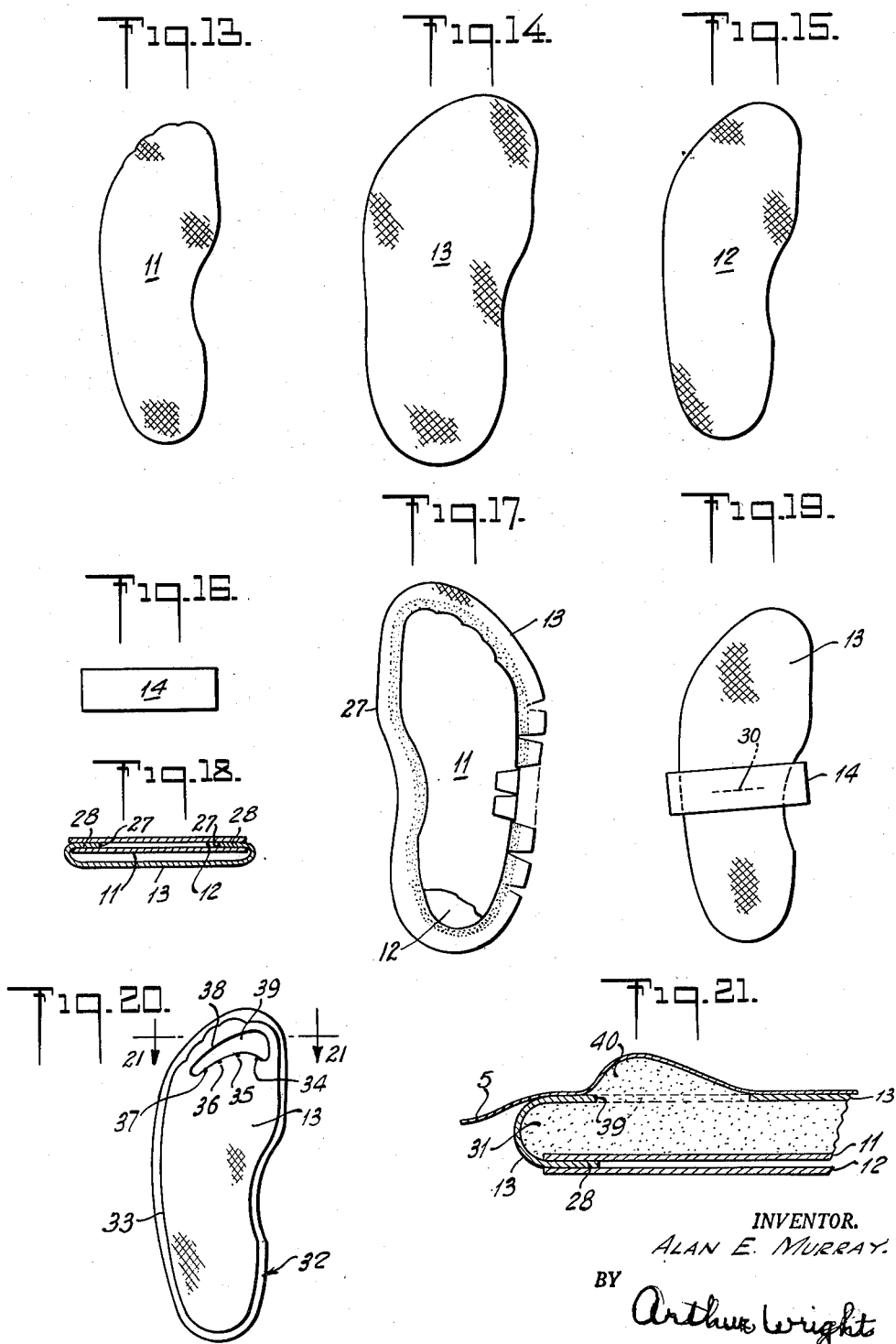

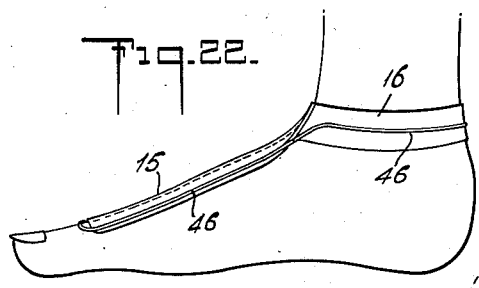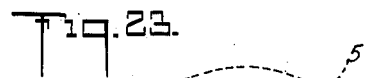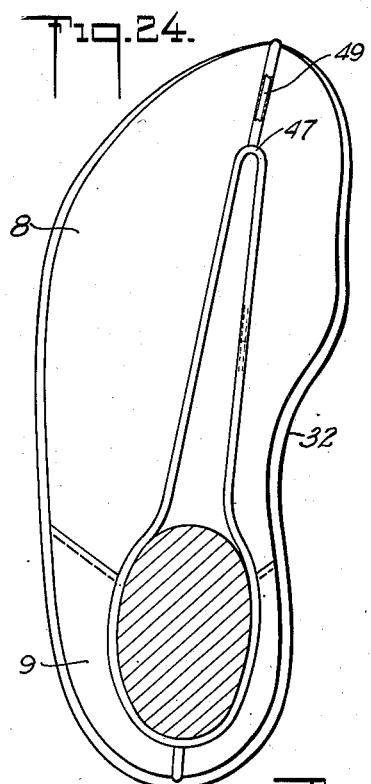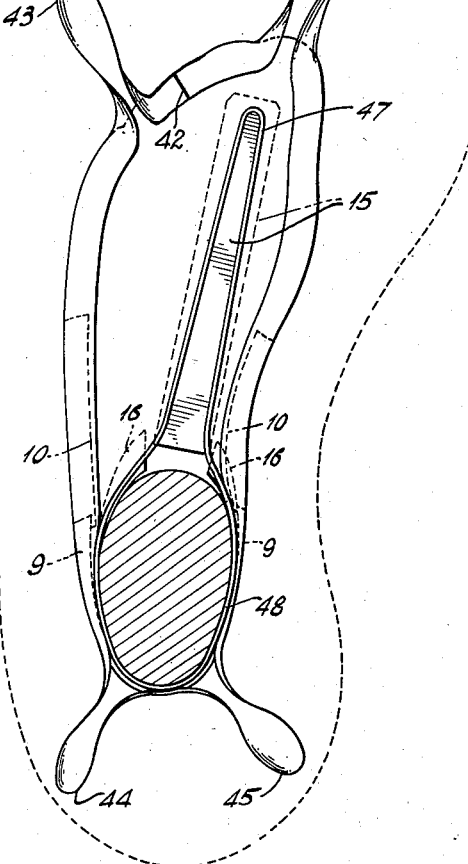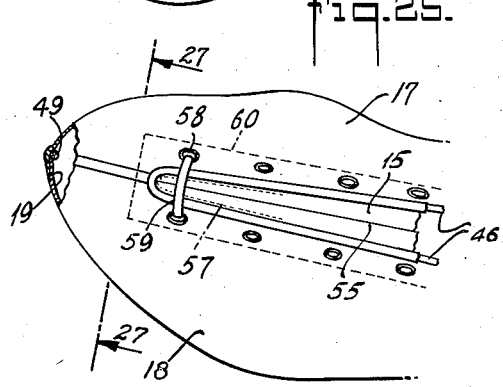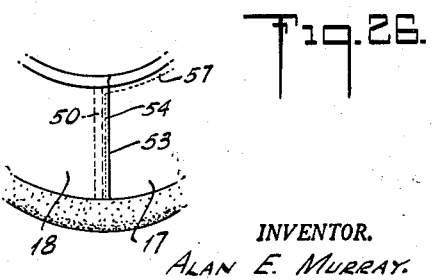
INVENTOR.
ALAN E. MURRAY.
BY Arthur Wright
ATTORNEY.

Patented Sept. 18, 1951

2,568,291

UNITED STATES PATENT OFFICE 2,568,291

PROCESS OF MAKING SHOES

Alan E. Murray, New York, N. Y.

Application December 19, 1946, Serial No. 717,246

9 Claims. (Cl. 12—142)

My invention relates particularly to a process of making shoes involving molding materials.

An object of my invention is to provide a process, whereby the shoes can be very effectively built up from molding and sheet materials on the foot or on a cast made of the foot, thus producing a shoe which conforms to all the necessary contours of the foot. A further object is to avoid undersiable seams or joints between the sheets of material used with the molding materials in making the shoes. Another object is to provide a shoe made in this manner, which does not require change or adjustment in size from the actual size of the foot or the cast made therefrom. Still another object is to provide a process by means of which the shoe which is made can be worn effectively, and preferably, very soon after the shoe is made and before the molding materials have set, so as to obtain a shoe comprising a composite of the static and dynamic shapes of the foot. Still another object is to make the shoe with a minimum expenditure of labor and time, and which is economical in the use of the materials utilized therein. Further objects of my invention will appear from the detailed description thereof hereinafter.

While my invention is capable of being carried out in many different ways, for the purpose of illustration I have described only certain embodiments thereof herein as illustrated in the accompanying drawings, in which—

Fig. 6 is a plan view of the heel piece;

Fig. 7 is a plan view of the reinforcer;

Fig. 8 is a diagram showing the natural outline in Fig. 3, but showing the cut out sheet of paper having a final adjusted outline for making the innermost layer pad pieces;

Fig. 9 is a plan view of a center edge liner;

Fig. 10 is a plan view of the ankle edge liner;

Fig. 11 is a plan view of the inside cover piece for one side of the foot, that is to say the inside of each of the feet;

Fig. 12 is a plan view of the outside cover piece for the other side, that is to say the outside of each of the feet;

Fig. 13 is a plan view of a flat piece of monk's cloth, coated with "latex," to form the innermost layer pad piece conforming to the new outline shown in Fig. 8;

Fig. 14 is a plan view of a top filler cover piece of monk's cloth;

Fig. 15 is a plan view of a bottom filler cover piece which forms the bottom of the pad;

Fig. 16 is a plan view of an opening cover piece to cover a slit made in the pad for introducing plastic material therein;

Figure 4:
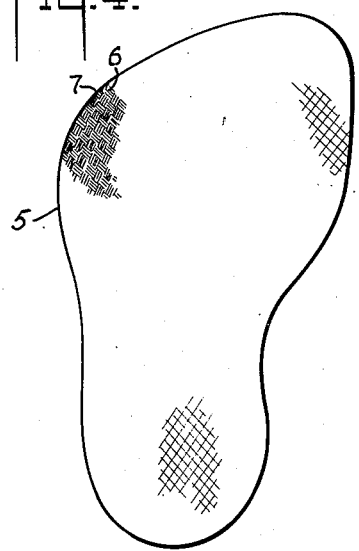
Fig. 4 is a plan view of the foot bottom cover piece.
Figure 5:
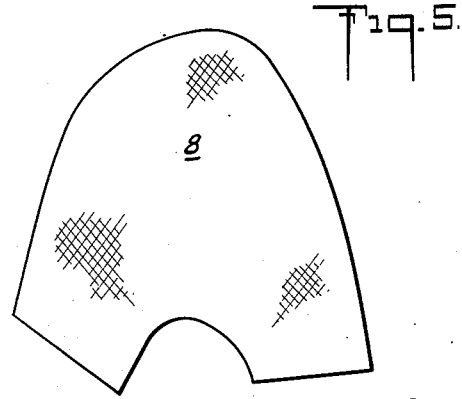
Fig. 5 is a plan view of the front cover piece.

Fig. 17 is an underneath view illustrating the making of the pad, which includes the flat piece of monk's cloth to form the innermost layer of fabric in the pad, and showing the top filler cover piece, of large marginal outline which is shown partially folded over and cemented to the innermost layer of monk's cloth, and also showing a rear fragmentary portion of the bottom filler cover piece of monk's cloth in position to be cemented to the folded-over edges of said top filler cover piece of monk's cloth;

Fig. 18 shows in the reverse of the final position, a cross-section of the pad layers of Fig. 17, showing the innermost layer of coated monk's cloth of Fig. 13, the top filler cover piece of Fig. 14 and the bottom filler cover piece of Fig. 15;

Fig. 19 is a plan view of the pad of Fig. 18 after being inverted into its natural position with the top filler cover piece on the upper side thereof, showing also the opening cover piece of Fig. 16;

Fig. 20 is a plan view showing the completed pad with the parts in a position the same as in Fig. 19, but having an outline of the foot, as well as the inner ends of the toe recesses, marked thereon and with an area marked thereon for a pyramid to be cut-out of the top pad cover piece for building thereon a pyramid fitting into the underneath toe recesses;

Fig. 21 is a transverse cross-section of the pad shown in Fig. 20 after having had applied to the pyramid opening an additional body of plastic material, and having located above the same the foot-bottom cover piece of Fig. 4 preparatory to forming the upper portion of the shoe, looking towards the rear of the pad;

Fig. 22 is a side elevation of a foot showing fastened thereto the center edge liner of Fig. 9 and the ankle edge liner of Fig. 10, as well as a cord for indicating the subsequent outline of the V-shaped cut-out, for a lacing, and for indicating the upper edge of the shoe;

Fig. 23 is a plan view of the foot, partly in section, having applied thereto the center edge liner and the ankle edge liner, showing the manner of applying the foot bottom cover piece, also indicating the tucks in the foot-bottom cover piece some of which are shown before being cut out;

Fig. 24 is a plan view showing the foot on which the shoe is being built partly in section and showing the front and rear vertical cords before applying the inside cover piece and outside cover piece of Figs. 11 and 12;

Fig. 25 is a partial plan view of the shoe showing the front joint between the inside and outside cover pieces, as well as the upwardly extending cut made through the center edge liner and the other layers for releasing the foot from the shoe;

Fig. 26 is a rear elevation showing the rear joint between the inside cover piece and outside cover piece;

Fig. 27 is a complete vertical section taken on line 27—27 of Fig. 25.

Figure 1:
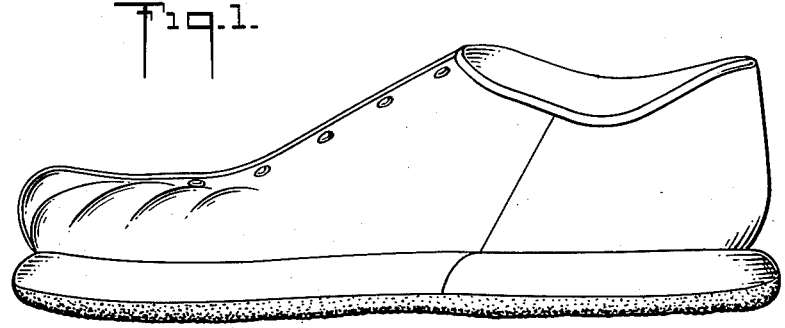
Fig. 1 is a side elevation of a shoe made in accordance with my invention.
Figure 3:
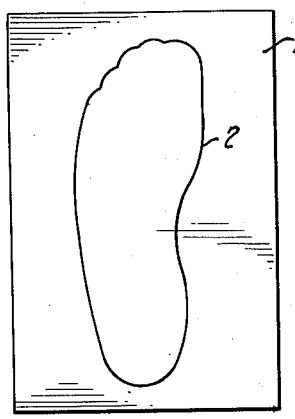
Fig. 3 is a similar view of a natural outline on a sheet of paper taken of the left foot.
Figure 2:
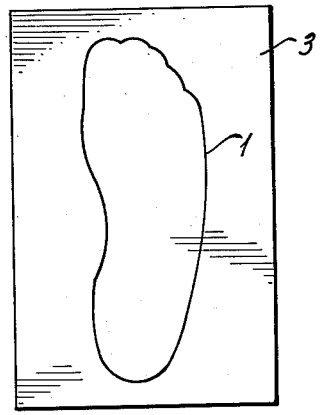
Fig. 2 is a plan view of a natural outline, of the right foot for example, made on a sheet of paper.

As shown in the drawings, I first make, with a pencil, outlines 1 and 2 of the right and left members having a foot shape, as for instance the feet of the wearer, respectively, as shown in Figs. 2 and 3, on sheets of paper 3 and 4 to be later modified as shown and described in connection with Figs. 3 and 8.

Then I provide the necessary cut-out pieces of fabric, leather, etc. Preferably, I use monk's cloth cut on the bias for the woven material layers and a soft flexible leather, such for instance as kid or very soft calf, for the leather layers, the inner leather layers being undyed and the outer leather layers having any desired color. Thus, in Fig. 4 I have shown a foot bottom cover piece 5 cut out of monk's cloth, which is a rather coarse loose weave material with a succession of groups of warp and weft fibers 6 and 7 indicated by squares of about $\frac{1}{16}''$ in width, preferably, as shown in Fig. 4. In other words, each group of warp fibres is about $\frac{1}{16}''$ wide, and the same is true of the weft groups of fibres. Also, I make a covering which may comprise a front cover piece 8 of monk's cloth, a heel piece 9 of monk's cloth, a reinforcer 10 of monk's cloth, and a coated innermost layer pad piece 11 (Figs. 13 and 18) made of monk's cloth but previously coated with "latex," that is to say a self-vulcanizing liquid neoprene or some other "latex" made of natural or artificial rubber, preferably the same as the "latex" hereinafter referred to in making the shoe. I also provide a bottom filler cover piece 12 of monk's cloth and a top filler cover piece 13 of monk's cloth. Also, I cut out an opening cover piece 14 of monk's cloth. All of the above pieces may be cut out with the aid of paper patterns or templates, if desired. Furthermore, I make with the aid of paper patterns or templates a series of leather pieces comprising a center edge liner 15 of natural soft thin undyed leather, an ankle edge liner 16 of natural soft thin undyed leather, and for the side of the left foot on the inside thereof an inside cover piece 17 made of kid or very soft calf, of natural undyed leather, but which may be dyed any desired color, for instance black, brown, etc., and for the side on the outside of the left foot an outside cover piece 18 of similar leather, which, it will be noted, is slightly higher in the middle portion than in the case of the inside cover piece 17. Furthermore, I provide a similar pair of inside and outside cover pieces, but of complementary shape, to the pieces 17 and 18, for the right foot.

Next, I modify the outlines 1 and 2 of the sheets of paper 3 and 4 in the manner as shown in Fig. 8, first for example, by providing a line 19 beyond the heel of the outline 2, to extend the same about $\frac{3}{16}''$ on the median line longitudinally of the foot. Then, beginning at the large toe, I provide a new outline 20 extending beyond the front of the toes about $\frac{1}{8}''$ down and around the foot, continuing in a line 21 around the outside of the foot spaced about $\frac{3}{16}''$ beyond the natural outline 2 and continuing in a line 22 about $\frac{3}{16}''$ beyond the new line 19 at the heel, thence into a line 23 at the heel portion of the foot within about $\frac{3}{16}''$ of the natural outline 2 to a point 24 at the beginning of the instep and then curving rather sharply inwardly to a line 25 at the instep which thereafter proceeds forwardly into a line 26 extending slightly outside the rear portion of the protuberance at the joint of the big toe. The sheet of paper is now cut out along these new lines to form a pattern (Fig. 8) having the shape of the layer 11, hereinafter referred to as the innermost layer pad piece, which pattern is temporarily pasted on a piece of monk's cloth that has been previously coated with an unthickened prevulcanized "latex" and then dried, by temporarily cementing the paper pattern to the coated monk's cloth with the aid of unthickened self-vulcanizing "latex." The monk's cloth is then cut out to correspond in shape and size to the paper pattern to form the innermost layer pad piece 11.

The innermost layer pad piece 11 is then laid (Fig. 17), with its coated side up, onto the center of the top filler cover piece 13 and there is then applied on the top filler cover piece 13 and on the edges of the coated innermost layer pad piece 11, around a wide margin 27 thereof, a layer of thickened "latex" made as hereinafter referred to. Then, the marginal edge of the top filler cover piece 13 is turned over to form a marginal fold 28 (Fig 18), which is pressed down tightly to cause it to adhere to piece 11. Now, the whole of this surface of the innermost layer pad piece 11 and marginal fold 28 are covered with a layer of thickened "latex" and the bottom filler cover piece 12 is then applied and caused to adhere thereto by pressing it down. While the "latex" coatings are still wet or only partly set, a slit 30 is made, with a pair of scissors, in the top pad cover piece 13 across the shank and a formable material such as a thick plastic mud 31, made with the aid of "latex" as hereinafter described, is introduced into the pad between the layers 11 and 13 until the pad is full throughout so as to provide a considerable thickness, as in Fig. 21, but not so as to be necessarily greatly distended. When this has been done a strip, of the top filler cover piece 13 on both sides of the slit 30, is covered with thickened "latex" and then the opening cover piece 14 is applied thereto and pressed down tightly, the excess margins thereof being cut off with scissors. This completes the formation of a pad 32 which, preferably, is to become a part of the finished shoe. The opening cover piece 14 may be dusted with plaster of Paris, if desired, before applying it to the surface of the top filler cover piece 13 which has been wet with the thickened "latex," as above referred to and wherever herein a surface of one fabric is made wet with any "latex" the surface of the other layer to which it is to be made to adhere may be dusted with plaster of Paris in the form of a fine powder, as the latter tends to abstract or combine with the water in the "latex" to make the same set more rapidly and more firmly.

The formable material such as the mud 31, above referred to, may be any suitable flexible resistant filling, but, preferably, it is made by mixing together about 4 parts by volume of Balsa wood flour, 1 part by volume of cork flour, and 1 part by volume of pine wood flour, each of which different kinds of wood flour contains some air naturally trapped therein by the particles of wood, and all of which different kinds of wood flour are thoroughly and homogeneously intermixed with a quantity of thickened neoprene "latex," such as referred to hereinafter, until just short of the amount and time when the mixture apparently begins to gel, which is accomplished with about equal parts by volume of the thickened "latex" and the wood flour, as for instance 1 part by volume of the thickened "latex" to 1¼ to 1½ parts by volume of the wood flour. The thickened "latex" used may, for example, be a self-vulcanizing water-suspended "neoprene" "latex" generally sold under the name "latex," or any other similar self-vulcanizing or prevulcanized water-suspended rubber or synthetic rubber substitute, and will vulcanize generally at room temperatures in 3 to 10 days, by allowing the water to evaporate or by dehydration in any desired manner. This "latex" may be thickened to form a thickened "latex" by adding any desired thickener. I may make a thickener, for example, by adding to about 10 parts by weight of solid fibrous methyl cellulose, sold under the name of "methocel," or any other water soluble cellulose ether or ester, an amount of distilled water equal to about 90 parts by weight of the "methocel," thus forming a high viscosity liquid. However, any other desired thickener can be used instead, as for instance any rubber or rubber substitute. Any desired proportions of the "latex," such for instance as neoprene "latex," by which I mean the unthickened "latex" referred to herein, and the said thickener may be made. For instance, to 5 gals. of the neoprene "latex" I may add 700 cc. of the methyl cellulose water solution above referred to, with stirring while cold. This forms, preferably after being allowed to set for two hours before using, a thickened "latex" such as may be used as the thickened "latex" wherever referred to herein. Wherever I have referred herein to a thinned "latex" I may use for that purpose a "latex" formed by mixing and stirring together 3 parts by volume of distilled water to 1 part by volume of the unthickened "neoprene" "latex" hereinabove referred to. However, wherever I have referred to "neoprene" "latex" herein or "latex," it will be understood, of course, that I mean thereby any "latex" which may be made from "neoprene" or from rubber or from some other synthetic rubber or rubber substitute.

As shown in Fig. 20, the pad 32 having thus been made, I place the member having a foot shape, as for instance the foot, on top of the pad in the center thereof and make an outline 33 on top of the filler cover piece 13, with a pencil held vertically, around the said member or foot substantially equidistant from the margin of the pad 32, and I also insert the pencil into the four grooves between the toes to make marks 34, 35, 36 and 37 corresponding to the inner ends of the toe recesses. Thereupon, I draw a closed line 38 through the points 34, 35, 36 and 37, and about ¼" away from the outer margin line 33 opposite to the toes, and I then cut out a "rib-chop" shaped part of the monk's cloth 13 along said line enclosing an area 39, extending forwardly about ½ the distance from the line through the points 34, 35, 36 and 37 to the ends of the toes. To said area I now apply a small amount of the mud to form a pyramid 40, such as the mud 31 previously referred to, and then, having coated the upper portion of the monk's cloth 13 around the outline 33 and to the rear of the points 34, 35, 36 and 37 with "neoprene" "latex" and having dusted the underside of the foot bottom cover piece 5 with plaster of Paris powder, the foot bottom cover piece 5 is applied over the top of the pad 32 with the pad in the center of the cloth, as shown in Fig. 21, and said piece 5 is then caused to adhere thereto. Thereupon, the foot is placed on top of the foot bottom cover piece 5, with the toe recesses on top of the pyramid 40, and the member or foot is pressed down to cause a pyramid to form in the recesses between the toes. A little of the "latex" is now placed in advance of the pyramid 40 between the foot bottom cover piece 5 and the pad 32. At this time the toes can be advantageously manipulated somewhat to aid in forming the pyramid beneath them, little pieces of cotton having been placed, if desired, in the upper portions of the toe recesses to limit the upper extent of the formation of the pyramid.

A lanolin hand cream lotion of any desired kind can then be rubbed on the feet to prevent undue sticking of the shoe to the feet while being molded thereon. Then the center edge liner 15 is coated underneath with a thinned "latex" and applied down the front ridge portion of the foot, as shown in Figs. 22 and 23, so as to cause the center edge liner 15 to adhere to the foot. Now, in a similar manner, the ankle edge liner 16 is coated inside with thinned "latex" and caused to adhere to the foot around the ankle thereof so that the two ends of the ankle edge liner 16 end near the sides of the upper end of the center edge liner 15. Also, the foot below the leather pieces 15 and 16 is then coated with a "latex" and the marginal edges of the foot bottom cover piece 5 are then folded up tightly around the edge of the foot so as to form five, or any desired number, of tucks as indicated at 41, 43, 44 and 45, one of which tucks has been made at butt seam 42, to take out all the fullness around the edges of the foot bottom cover piece 5. These tucks are then cut off with a curved scissors so that the remaining radial edges of the turned-up portions of the foot bottom cover piece 5 fit together exactly along radial lines of the foot as indicated by the butt seam 42 and now all the turned-up edges of the foot bottom cover piece 5 will remain adherent to form a complete single-layer coverage of the margin of the foot. Any irregular marginal portions of the turned-up edge of the foot bottom cover piece 5 may be cut off, at this time, with curved scissors. Next, the upper turned-up marginal portions of the foot bottom cover piece 5 are coated on the outside with the "latex," as well as the exposed portions of the feet, including the outer surfaces of the center edge liner 15 and the ankle edge liner 16. The front cover piece 8 is then applied over the front of the foot, as shown in Fig. 24, having previously dusted the underside of the front cover piece 8 with the plaster of Paris powder. Thereafter, in a similar manner, the heel piece 9 is applied, after dusting the undersurface of the same with plaster of Paris, so that its front marginal portions overlie the rear edges of the front cover piece 8. Thereupon, there is applied over the rear and sides of the foot the reinforcer 10, going from bunion to bunion around the rear of the foot, after having applied thickened "latex" to the rear exposed portions of the heel piece 9 and the front cover piece 8 and having dusted the underside of the reinforcer 10 with the plaster of Paris powder. The marginal portions of the front cover piece 8, the heel piece 9 and the reinforcer 10 may now be cut off up to and just inside of the margin of the pad 32, as shown in Figs. 24 and 27. A cord 46, having a V-shape at the front of the foot over the center edge liner 15 and extending around the ankle, so as to form a V 47 at the front of the foot where the edges of the shoe are to be located adjacent to the shoe lacing and a curvature 48 around the ankle where the top of the shoe is to be located, is then applied with the thinned "latex" solution, the portion 48 being located over the ankle edge liner 16. Furthermore, there is applied over the central front portion of the shoe, to meet the V 47, a cord 49, and at the rear of the shoe a cord 50 extending vertically at the middle of the heel down from the cord 48, with the aid of thinned "latex." Also, the V-shaped portion of the front cover piece 8, between the parts of the V 47, can be cut out with a scissors, and any part of the heel piece 9 which extends above the cord 48 may be cut off. Also, the upper edge of the reinforcer 10 may be trimmed off. Thereupon, I apply a priming of the thinned "latex" to the leather center edge liner 15 between the parts of the V-shaped cord 47 and also to the upper margin of the ankle edge liner 16 above the cord 48. Thereupon, I prime, with unthickened "latex," the inner surfaces of the inside cover pieces 17 of leather and outside cover pieces 18 of leather and apply them to the inside portions of the feet and to the outside portions of the feet respectively and work these pieces of leather into the indentation between the edges of the sole and the upper with a tool. Also, as shown in Fig. 26, the outside cover piece 18 forms a lap over the inside cover piece 17, the vertical edge of the outer cover piece 18 having been provided with a neat finish, by pressing the same together. Similarly, the rear of the shoe has its vertical edge forming a lap 53 over the cord 50, to be provided later with stitching 54. The leather pieces 17 and 18 are, furthermore, worked into the edges of the cords 46, 50 and 52 with the aid of a tool. The cord 52 is, preferably, just slightly thicker than the thickness of the leather piece 18. The lower marginal edges of the leather pieces 17 and 18 can, also, be trimmed off up to the extreme outer edge of the pad 32. Also, if desired, saddle soap may be worked into the outer leather surface of the shoe, the same being rubbed in thoroughly so as to have the shoe conform entirely to the contours of the foot.

Thereupon, the center edge liner 15 is cut longitudinally to provide a slit 55 on the middle of the V 47, and the shoe is removed from the foot. Then the marginal edges of the leather within the V 47 are cut out and the upper margin of the leather at the top of the shoe is trimmed off above the cord 48. Stitching 57 may now be applied around the upper margin of the shoe and around the inside of the V 47, and, if desired, the stitching may be applied before the trimming of the upper margin and the V-shaped recess of the shoe. Eyelets 58 may now be applied outside of the V 47, for a lacing 59. The sole thickness may be amplified by applying to the bottom of the shoe one or more thicknesses of terry cloth 59a or ratine cloth. Each of such thicknesses of cloth or sole material may be applied by covering the undersurface of the shoe with an unthickened "latex" and then applying a layer of the cloth, saturated with unthickened "latex," and adding to the cloth, which has been wet with the said "latex," any desired amount of powdered plaster of Paris. Preferably, the shoe should now be worn on the following day, for about one hour, while the plastic materials are still moist or in the process of setting. Also, it is advantageous for the shoes to be worn two or three hours each day thereafter, for the following week, by which time the materials will have set completely. The shoes will now have attained a shape and contour fitting the feet as to every small portion thereof, not only with relation to the static shape of the feet but also due to the dynamic position of the feet in wearing the shoes while walking therein. This perfection of contour can be aided, also, by using the shoes without socks for two or three days following the day when they are made. For the purpose of adding further sole material to the shoe at the end of the said week or ten days in which the shoes are being allowed to set, further sole thicknesses may be added by applying thereto one or more layers of terry cloth or ratine cloth. This can be done by applying to the bottom of the shoe an unthickened "latex" and applying the terry or ratine cloth, saturated with unthickened "latex" and padded with a considerable amount of powdered plaster of Paris. Any number of additional layers may be added in this way, and even heel pieces, to provide added thickness for the heel of the foot, may be added in the same way, if desired. At the time when the soling is being applied, a tongue 60, of leather or other fabric, may be introduced, but, preferably, this is done at the time when the final soling is applied, by cementing with "latex" or sewing the front portion of the tongue 60 to the interior of the shoe beyond the end of the V 47 and beneath the lacing 59.

If desired, instead of making the above shoe on the human foot it can be made on a member having a foot shape, such as a plaster cast made to conform to the foot of the wearer according to the effective impression technique as set forth in my patent upon Process of Obtaining Effective Foot Impressions and Products Thereof, No. 2,177,304, granted October 24, 1939. In that event, when the shoe has been made on the plaster cast the latter can be broken out of the shoe with a chisel or any other desired tool, leaving the shoe made in substantially the same manner as if it had been made on the human foot. Also, if desired, no matter whether the shoe is made on a human foot in accordance with the process described in detail hereinabove, or whether the shoe is made on a cast by the use of a plaster cast as obtained in accordance with my patent aforesaid, the sole material or soles can be built up on the shoes instead, if desired, as described in detail in my patent upon Method of Manufacturing Shoes, No. 2,332,000, granted October 19, 1943, and in accordance with my copending application upon Laminated Pile-Fabric Shoe Sole, Ser. No. 555,005, filed September 20, 1944, now Patent Number 2,448,455, granted August 31, 1948.

Furthermore, it will be understood that it is not necessary to use leather for the edge liners 15 and 16 herein, but any other kind of fabric, woven or otherwise, may be used, or they can be omitted, if desired. Also, it will be understood that even the inside and outside cover pieces 17 and 18 in the leather of the shoes described in detail hereinabove, may be substituted by any kind of fabric, woven or otherwise, such for instance as terry cloth or ratine cloth or monk's cloth, and when cloth is used in these pieces of the shoe the shoe may be sprayed with any desired metal containing composition or color or coated in any other desired manner, especially when the shoes are being made for children. In fact such cloth sprayed with metal particles is much more durable than even leather.

As still another variation of the procedure of making shoes in accordance with my invention, a shoe-like shell can be made on the human foot, as described above in detail, until the foot is removed from the shoe, as described hereinabove, without the inside and outside cover pieces 17 and 18 having been applied, or, instead, with cover pieces 17 and 18 made of monk's cloth being applied instead of leather. Then the front edges of the shoe inside the V may be secured together by means of the thickened "latex" after cutting out a strip tapered towards the lower end, if desired, $1/8$ to $3/16''$ wide along one side or the other of the cut 55. The outside of the shell may then be stiffened by applying to the outside of the shell plaster of Paris and water, to which has been added, preferably, a little salt for increased stiffening, in an amount of about 5% by weight of the whole, to form a thick flowable viscous liquid. This plaster is placed all over the outside, including the sole, and allowed to set. The shoe-like shell is then filled, while the "latex" is not yet set, with plaster of Paris mixed with water to make a hard cast in the shoe and allowed to remain in this condition until the plaster has become set or hard. This is the plaster cast on which the final shoe can be built as above, after stripping from the cast the outside shoe-like shell. After the shoe is built on this plaster cast, in the same way as above described in detail when the shoe is built on the foot itself, the hardened plaster in the shoe can be removed by breaking it out of the shoe with a chisel or other tool.

When the shoes are made on a plaster cast in this way, there is an advantage, in that there is more time available, than when the shoe is made on the foot, for making different designs on the outside of the shoe beneath the outer layers, as by merely adding more cords like the cords 46 and 50 but at different places on the shoe beneath the outermost layer or layers of leather or other material forming the outside of the shoe. Also, the V-shape 47 formed by cutting out the outer layer of the shoe may be altered as to its position on the shoe and supplemented with other cut-outs on the shoe, of a similar or other shape, as desired.

It is found that shoes made in the above manner on a member having a foot-shape, that is to say constituting the human foot or a cast thereof, do not require any reduction of length or other change in dimensions in the manufacture of the shoes. This is due partly to the natural tendency of materials to shrink while they are in the process of setting. Furthermore, this adjustment of size, if any such adjustment is desired, can be attained by making the V 47 extend further towards the front of the shoe and by making the portion of the shoe which is cut out, extend farther towards the front of the shoe. By means of the lacing 59, also, more or less adjustment to the size of the foot can be attained, as desired.

While I have described my invention above in detail I wish it to be understood that many changes may be made therein without departing from the spirit of the same.

I claim:

1. The process of making a shoe which comprises providing a pad enclosing a formable material, securing a flat foot-bottom cover piece wider than the pad directly to one surface of the pad, placing over the foot-bottom cover piece a member having a foot shape resting on and in contact with the foot-bottom cover piece, sticking the upper margin of the foot-bottom cover piece to the sides of the member, and fastening by an adhesive material to the periphery of the pad below the foot-bottom cover piece and directly to the outer margin of the foot-bottom cover piece above the pad a covering to produce the upper part of the shoe.

2. The process of making a shoe which comprises providing a pad enclosing a formable material, securing a flat foot-bottom cover piece wider than the pad directly to one surface of the pad, placing over the foot-bottom cover piece a member having a foot shape resting on and in contact with the foot-bottom cover piece, sticking the upper margin of the foot-bottom cover piece to the sides of the member, cutting out the one or more marginal tucks thus produced so as to fit together the adjacent marginal cut-out edges, securing a reinforcer bridging over said cut-out edges around the rear of the shoe, and fastening by an adhesive material to the periphery of the pad below the foot-bottom cover piece and directly to the outer margin of the foot-bottom cover piece above the pad a covering to produce the upper part of the shoe.

3. The process of making a shoe which comprises providing a pad enclosing a formable material, securing a flat foot-bottom cover piece wider than the pad directly to one surface of the pad, placing over the foot-bottom cover piece a member having a foot shape resting on and in contact with the foot-bottom cover piece, sticking the upper margin of the foot-bottom cover piece to the sides of the member, and fastening by an adhesive material to the periphery of the pad below the foot-bottom cover piece and directly to the outer margin of the foot-bottom cover piece above the pad a covering to produce the upper part of the shoe by means of an ankle edge liner fastened to the ankle and adherent thereto.

4. The process of making a shoe which comprises providing a pad enclosing a formable material, securing a flat foot-bottom cover piece wider than the pad directly to one surface of the pad, placing over the foot-bottom cover piece a member having a foot shape resting on and in contact with the foot-bottom cover piece, sticking the upper margin of the foot-bottom cover piece to the sides of the member, and fastening by an adhesive material to the periphery of the pad below the foot-bottom cover piece and directly to the outer margin of the foot-bottom cover piece above the pad a covering to produce the upper part of the shoe by means of an ankle edge liner and foot-center edge liner fastened to the ankle and adherent thereto and foot-center edge liner.

5. The process of making a shoe which comprises providing a pad enclosing a formable material, securing a flat foot-bottom cover piece wider than the pad directly to one surface of the pad, placing over the foot-bottom cover piece a member having a foot shape resting on and in contact with the foot-bottom cover piece, sticking the upper margin of the foot-bottom cover piece to the sides of the member, and fastening by an adhesive material to the periphery of the pad below the foot-bottom cover piece and directly to the outer margin of the foot-bottom cover piece above the pad a covering to produce the upper part of the shoe, said covering comprising two side cover pieces to cover the inside and outside of the foot, respectively.

6. The process of making a shoe which comprises providing a pad enclosing a formable material, securing a flat foot-bottom cover piece wider than the pad directly to one surface of the pad, placing over the foot-bottom cover piece a member having a foot shape resting on and in contact with the foot-bottom cover piece, sticking the upper margin of the foot-bottom cover piece to the sides of the member, and fastening by an adhesive material to the periphery of the pad below the foot-bottom cover piece and directly to the outer margin of the foot-bottom cover piece above the pad a covering to produce the upper part of the shoe by means of an ankle edge liner and foot-center edge liner fastened to the ankle and adherent thereto and foot-center edge liner, said covering comprising two side cover pieces to cover the inside and outside of the foot, respectively.

7. The process of making a shoe which comprises providing a pad enclosing a formable material, securing a flat foot-bottom cover piece wider than the pad directly to one surface of the pad, placing over the foot-bottom cover piece a member having a foot shape resting on and in contact with the foot-bottom cover piece, sticking the upper margin of the foot-bottom cover piece to the sides of the member, and fastening by an adhesive material to the periphery of the pad below the foot-bottom cover piece and directly to the outer margin of the foot-bottom cover piece above the pad a covering to produce the upper part of the shoe by means of an ankle edge liner, said covering comprising a front cover piece, a heel piece and a reinforcer extending around the heel and both sides of the foot.

8. The process of making a shoe which comprises providing a pad enclosing a formable material, securing a flat foot-bottom cover piece wider than the pad directly to one surface of the pad, placing over the foot-bottom cover piece a member having a foot shape resting on and in contact with the foot-bottom cover piece, sticking the upper margin of the foot-bottom cover piece to the sides of the member, and fastening by an adhesive material to the periphery of the pad below the foot-bottom cover piece and directly to the outer margin of the foot-bottom cover piece above the pad a covering to produce the upper part of the shoe by means of ankle edge liner and foot-center edge liner fastened to the ankle and adherent thereto, said covering comprising a front cover piece, a heel piece and a reinforcer extending around the heel and both sides of the foot.

9. The process of making a shoe which comprises providing a pad enclosing a formable material, securing a flat foot-bottom cover piece wider than the pad directly to one surface of the pad, placing over the foot-bottom cover piece a member having a foot shape resting on and in contact with the foot-bottom cover piece, and sticking the upper margin of the foot-bottom cover piece to the sides of the member, after forming a pyramid corresponding to the toe recesses between the pad and the foot-bottom cover piece by cutting out an area in the top of the pad corresponding to the base of said pyramid and introducing formable material into said cut-out.

ALAN E. MURRAY.

REFERENCES CITED

The following references are of record in the file of this patent:

UNITED STATES PATENTS

| Number | Name | Date |
|---|---|---|
| 2,136,815 | Forster | Nov. 15, 1938 |
| 2,332,000 | Murray | Oct. 19, 1943 |
| 2,396,926 | Murray | Mar. 19, 1946 |
| 2,404,083 | Murray | July 16, 1946 |